United States Patent
Koyanagi

(10) Patent No.: US 6,839,194 B2
(45) Date of Patent: Jan. 4, 2005

(54) DISK DRIVE APPARATUS AND METHOD FOR GENERATING SERVO SECTOR PULSE

(75) Inventor: Takahiro Koyanagi, Ome (JP)

(73) Assignee: Kabushiki Kaisha Toshiba, TOkyo (JP)

(*) Notice: Subject to any disclaimer, the term of this patent is extended or adjusted under 35 U.S.C. 154(b) by 470 days.

(21) Appl. No.: 10/095,573

(22) Filed: Mar. 13, 2002

(65) Prior Publication Data

US 2003/0026022 A1 Feb. 6, 2003

(30) Foreign Application Priority Data

Aug. 2, 2001 (JP) ........................................ 2001-235106

(51) Int. Cl.[7] .......................... G11B 5/09; G11B 5/596
(52) U.S. Cl. .................. 360/51; 360/78.14; 360/77.08; 360/49; 360/48; 360/98.01; 360/78.09; 369/43; 369/44.25; 369/44.26; 369/44.31; 369/44.34
(58) Field of Search ........................... 360/77.02–77.03, 360/77.05, 77.06, 77.07, 77.08, 77.11, 51, 55, 48–49, 78.14, 78.04, 98.01, 78.09, 78.07; 369/43, 44.25, 44.26, 44.31, 44.34, 47.21, 47.48; 324/207.21, 210, 212; 318/569, 600, 636, 560–561

(56) References Cited

U.S. PATENT DOCUMENTS 5,479,301 A * 12/1995 Takeuchi ..................... 360/51
5,650,882 A * 7/1997 Tsurumi et al. ............... 360/51
5,706,265 A * 1/1998 Bang ........................ 369/47.48
5,903,410 A    5/1999 Blaum et al.
6,014,276 A * 1/2000 Takase ........................ 360/49
6,021,012 A    2/2000 Bang
6,115,199 A * 9/2000 Bang .......................... 360/51

FOREIGN PATENT DOCUMENTS

JP       07-037326   * 2/1995
JP        8-31102      2/1996
JP      2000-100095  * 4/2000

* cited by examiner

Primary Examiner—Sinh Tran
Assistant Examiner—Natalia Figueroa
(74) Attorney, Agent, or Firm—Pillsbury Winthrop LLP

(57) ABSTRACT

A servo mark detector detects a servo mark from each servo information item detected by the servo detector. A counter measures a time period each time a servo mark is detected, thereby measuring a servo interval. A correction circuit corrects a time period T2 on the basis of the measured servo interval and an ideal servo interval. A determination circuit determines which one of the time period T2 and a time period T2' obtained by correcting the time period T2 should be used. A servo-sector-pulse-generating unit generates a servo sector pulse a time period T1 after the detection of each servo mark, and generates a pseudo servo sector pulse when the time period determined by the determination circuit has elapsed after the detection of each servo mark, if the next servo mark is not detected during the determined time period.

24 Claims, 5 Drawing Sheets

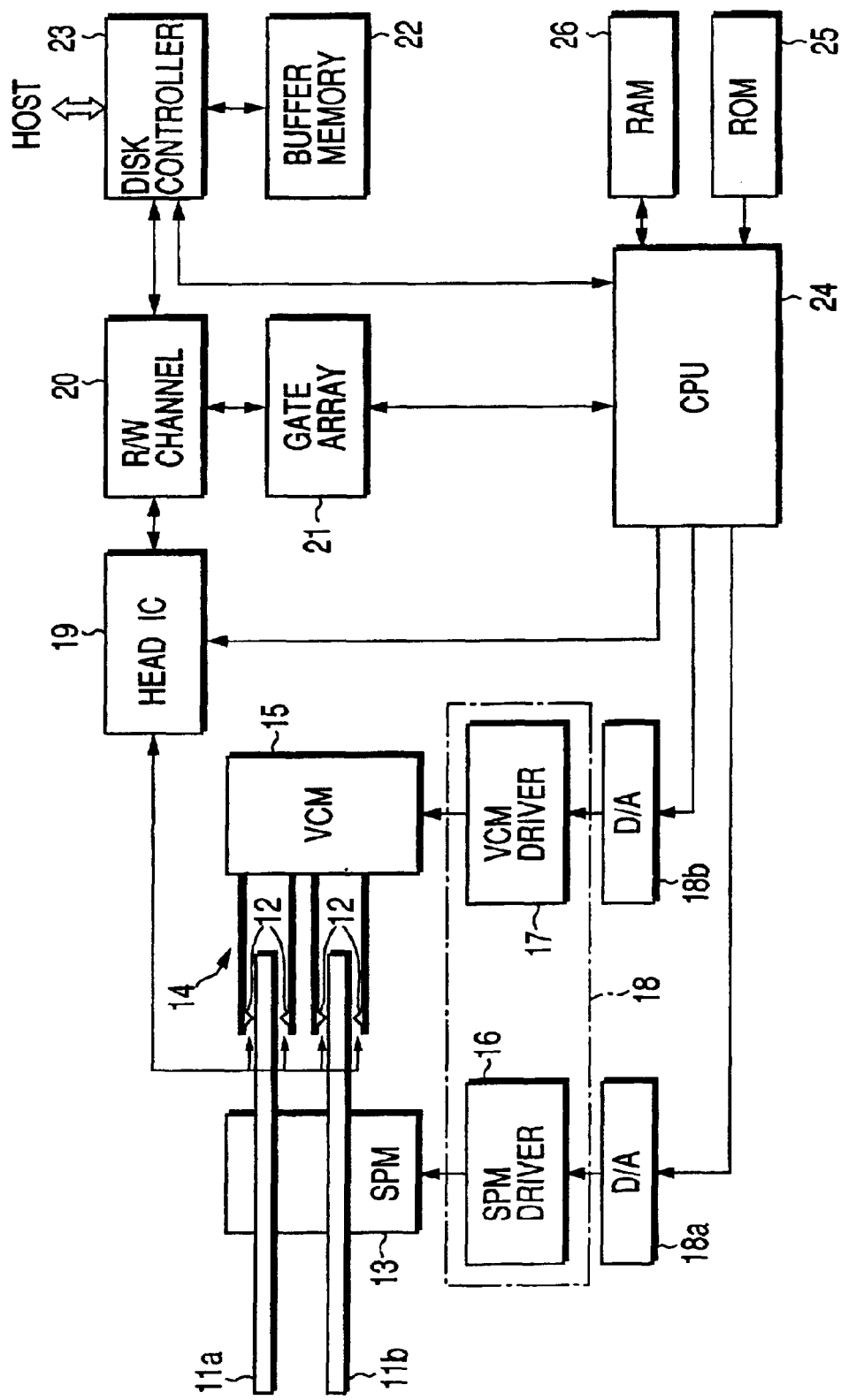
F I G. 1

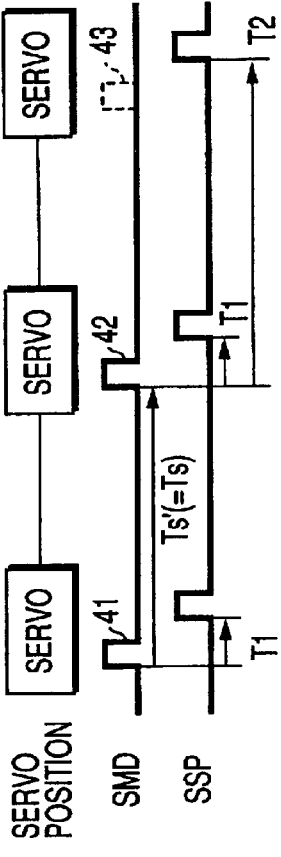
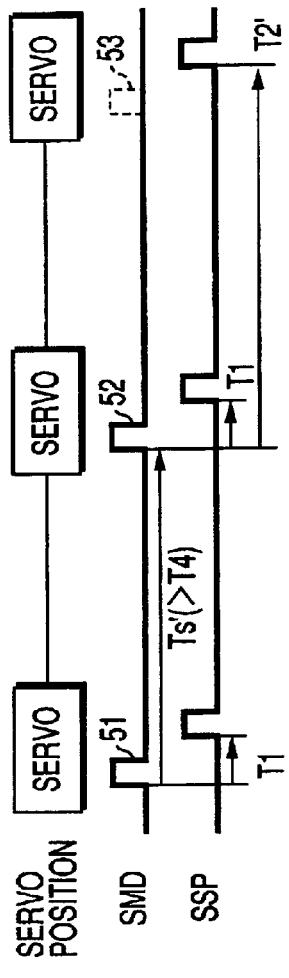
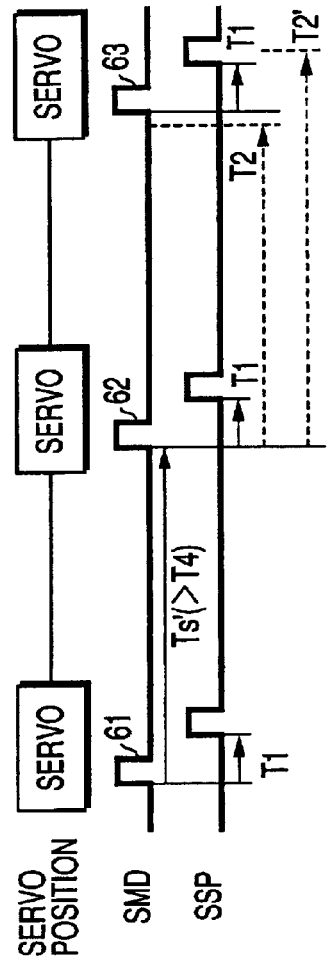
FIG. 4A
FIG. 4B
FIG. 4C
FIG. 5A
FIG. 5B
FIG. 5C
FIG. 6A
FIG. 6B
FIG. 6C

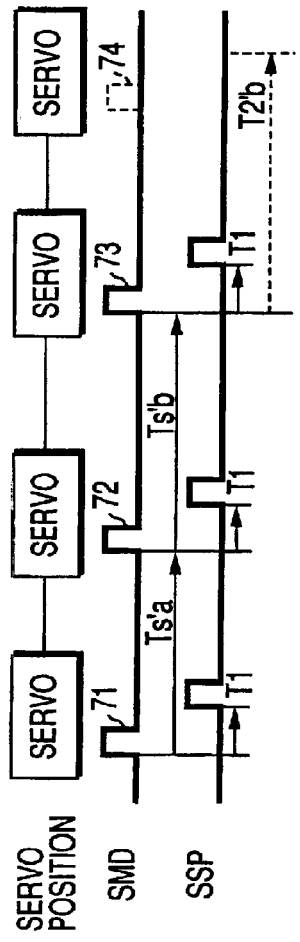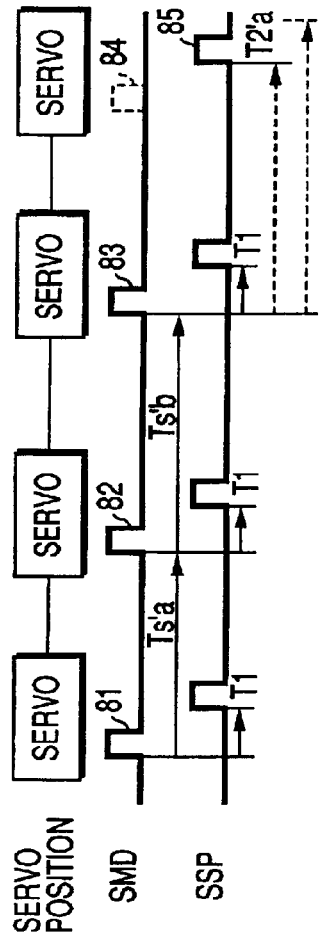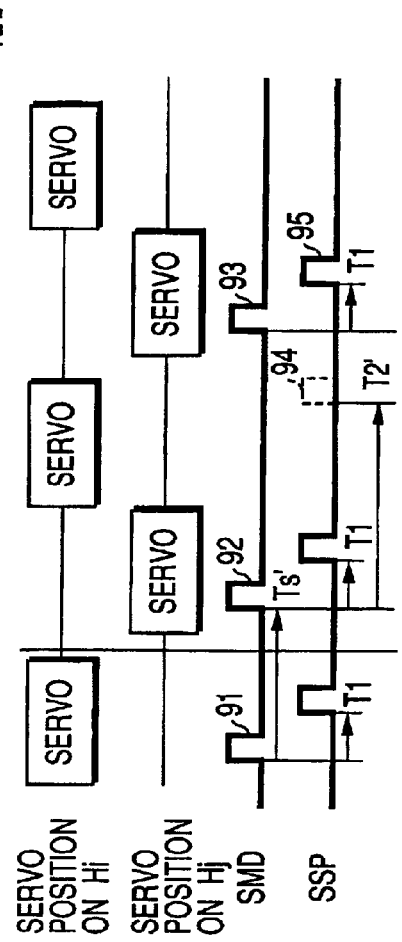

DISK DRIVE APPARATUS AND METHOD FOR GENERATING SERVO SECTOR PULSE

CROSS-REFERENCE TO RELATED APPLICATIONS

This application is based upon and claims the benefit of priority from the prior Japanese Patent Application No. 2001-235106, filed Aug. 2, 2001, the entire contents of which are incorporated herein by reference.

BACKGROUND OF THE INVENTION

1. Field of the Invention

The present invention relates to a disk drive apparatus equipped with disks on which servo information is prestored at regular intervals in the direction of the circumference of the disk, and more particularly to a disk drive apparatus and method for detecting a servo mark contained in the servo information and used to identify it, thereby generating a servo sector pulse.

2. Description of the Related Art

A hard disk drive is known as a disk drive using disks as storage mediums. In the hard disk drive, a head positioning control is executed in which a head is moved to a target track and is then positioned in a target area on the target track. Head positioning control is generally executed on the basis of servo information discretely recorded on each disk at regular intervals in the direction of the circumference of each disk. Further, head positioning control is executed during an interrupt process executed by a CPU. The interrupt process is executed in accordance with a servo sector pulse. The servo sector pulse is generated in accordance with the detection of a servo mark contained in the servo information and used to identify it.

To generate the servo sector pulse, two types of generating methods as described in Jpn. Pat. Appln. KOKAI Publication No. 8-31102 are used. In the first servo-sector-pulse-generating method, a particular pattern for generating a servo sector pulse, i.e., a servo mark for identifying servo information, is detected. The particular pattern or servo mark is contained in servo information recorded on each of the servo areas (servo sectors) that are discretely arranged at regular intervals on each disk in the direction of the circumference of each disk. Each time a servo mark is detected, a servo sector pulse is generated at a time point (first timing) a predetermined time period T1 after the detection time of the servo mark. In the second servo-sector-pulse-generating method, the servo sector pulse is generated at a time point (second timing) a predetermined time period T2 (T2>>T1) after the detection time of a preceding servo mark. To measure the time period T2, a timer is used. When the first and second servo-sector-pulse-generating methods are used, even if the detection of a servo mark has failed due to, for example, noise, the failure can be compensated for by generating a pseudo servo sector pulse the predetermined time period T2 after the detection time of a preceding servo mark.

As described above, in the prior art, when a servo mark contained in servo information is detected, a servo sector pulse is generated at the first timing the predetermined time period T1 after the detection. Further, when the detection of a servo mark has failed for some reason, a servo sector pulse is generated at the second timing the predetermined time period T2 after the detection of a servo mark from servo information recorded in a preceding servo area. Thus, the failure of generation of a servo sector pulse due to the failure of detection of a servo mark can be compensated for.

However, in the prior art, no consideration is given to the fact that the intervals at which servo information is detected, i.e., the servo intervals, vary according to changes in the rotational speed of a disk, i.e., a motor for spinning the disk, or runout of the disk, i.e., runout of the motor shaft. Accordingly, in the prior art, the predetermined time period T2 is always used as the timing (second timing) for generating a pseudo servo sector pulse when the detection of a servo mark has failed.

Therefore, in the prior art, if the servo intervals exceed the time period T2, it is determined that the detection of a servo mark has failed, thereby generating a servo sector pulse at the second timing the predetermined time period T2 after the detection of a preceding servo mark. Accordingly, if the servo intervals vary due to changes in the rotational speed of a disk or runout of the disk, it is possible that two servo sector pulses will be generated at different time points for one servo information item corresponding to one servo area.

BRIEF SUMMARY OF THE INVENTION

The present invention has been developed in light of the above, and aims to dynamically correct a servo-sector-pulse timing, in accordance with changes in servo interval, when a servo mark for identifying servo information has not been detected, thereby preventing two servo sector pulses from being generated for one servo information item.

According to an aspect of the invention, there is provided a disk drive apparatus comprising: at least one disk including at least one recording surface on which servo information items are recorded discretely at regular intervals in a direction of the circumference of the at least one disk, the servo information items including respective position information items and respective servo marks used to identify the servo information items; and a head provided for the at least one recording surface and used to read information from the at least one disk. The disk drive apparatus also comprises a servo detector, a servo mark detector, a counter, a correction circuit, a determination circuit and a servo-sector-pulse-generating unit. The servo detector detects each servo information item from the information read by the head from the disk. The servo mark detector detects a corresponding one of the servo marks from each servo information item detected by the servo detector. The counter measures a servo interval, the servo interval being an interval between two successive servo marks detected by the servo mark detector. The correction circuit corrects a predetermined time period T2 on the basis of the servo interval measured by the counter and a predetermined ideal servo interval. The determination circuit determines which one of the time period T2 and a time period T2' obtained by correcting the time period T2 using the correction circuit should be used. The servo-sector-pulse-generating unit generates a servo sector pulse a predetermined time period T1 after the servo mark detector detects each servo mark, the time period T1 being shorter than the time period T2. The servo-sector-pulse-generating unit also generates a pseudo servo sector pulse when the time period determined by the determination circuit has elapsed after the detection of each servo mark, if a next servo mark is not detected during the time period determined by the determination circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a hard disk drive according to an embodiment of the present invention;

FIGS. 4A–4C are timing charts useful in explaining an operation of the embodiment;

FIGS. 5A–5C are timing charts useful in explaining an operation of the embodiment;

FIGS. 6A–6C are timing charts useful in explaining an operation of the embodiment;

FIGS. 7A–7C are timing charts useful in explaining a first modification of the embodiment;

FIGS. 8A–8C are timing charts useful in explaining a second modification of the embodiment; and FIGS. 9A–9D are timing charts useful in explaining a third modification of the embodiment.

DETAILED DESCRIPTION OF THE INVENTION

An embodiment in which the invention is applied to a hard disk drive will be described with reference to the accompanying drawings. FIG. 1 is a block diagram illustrating the configuration of the hard disk drive according to the embodiment of the invention. In the hard disk drive (hereinafter referred to as an "HDD") shown in FIG. 1, a number (e.g. two) of disks (magnetic disk mediums) 11*a* and 11*b*, on which data is magnetically recorded, are stacked. Each disk 11*i* (i=a, b) has two disk surfaces (upper and lower surfaces). At least one (e.g. both) of the two surfaces of each disk 11*i* serves as a recording surface for recording data. Heads (magnetic heads) 12, which are used to read/write data from/to each disk 11*i* (data reproduction/recording), are provided for the respective recording surfaces of each disk 11*i*. The number of disks is not limited to two. The HDD may be equipped with a single disk or three or more disks.

Figure 2:
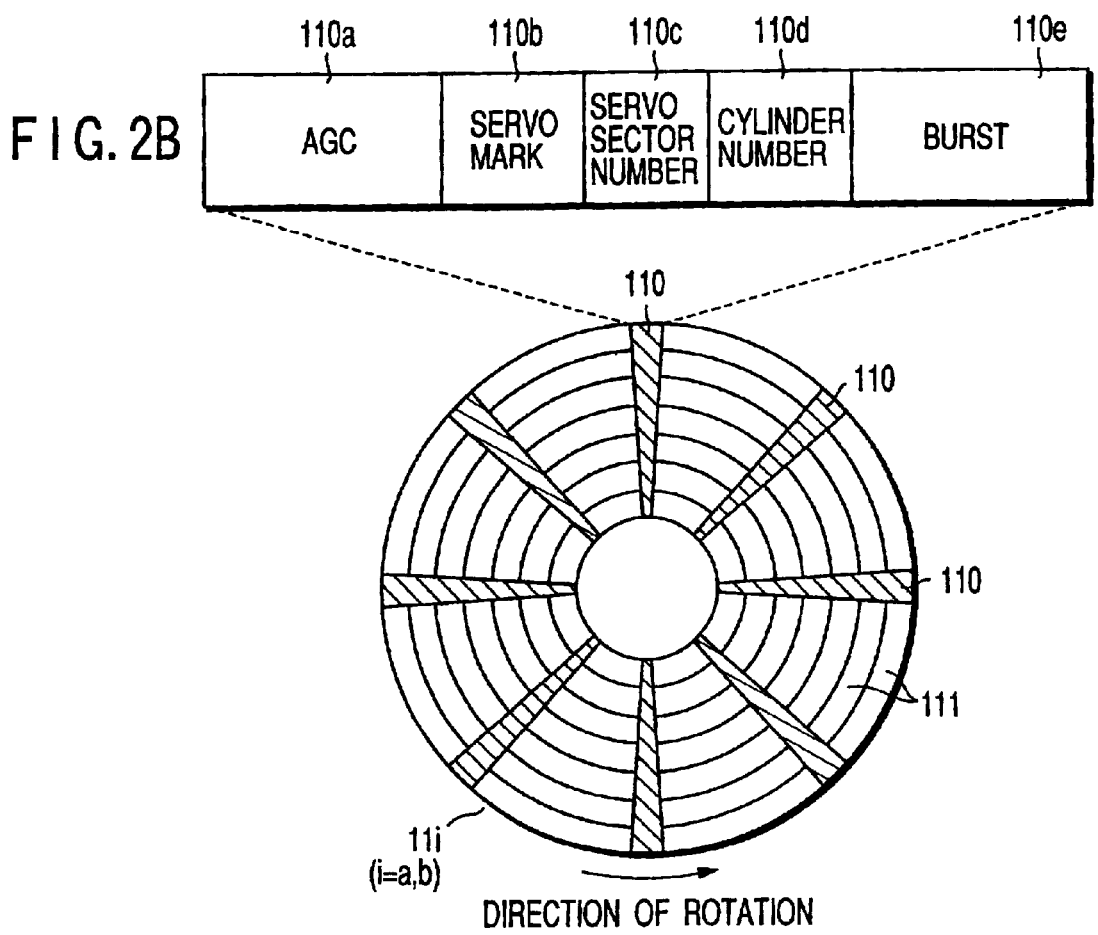
FIG. 2A is a view illustrating the concept of a format employed for a disk 11*i* (i=a, b) appearing in FIG. 1.
FIG. 2B is a view illustrating the concept of a data format for a servo area arranged on the disk 11*i*.

As shown in FIG. 2A, a plurality of servo areas (servo sectors) 110 radially extend on each recording surface of the disks 11*a* and 11*b* discretely at regular intervals in the direction of the circumference of each disk 11*i*. Each servo area 110 stores servo information used for, for example, head positioning control. A number of concentric tracks 111 are formed on each recording surface of the disks 11*a* and 11*b*. A user data area is provided between each pair of adjacent servo areas 110, and includes a plurality of data sectors arranged therein.

As shown in FIG. 2B, each servo area 110 comprises an AGC section 110*a*, a servo mark section 110*b*, a servo sector number section 110*c*, a cylinder number section 110*d* and a burst section 110*d*. The AGC section 110*a* stores a signal of a predetermined frequency (AGC signal) used to stabilize the amplitude of a read signal. The servo mark section 10*b* stores a special mark (servo mark) for identifying each servo area 110 (i.e., servo information recorded therein). The servo mark is used to generate a servo sector pulse SSP. The servo sector number section 110*c* stores a servo sector number n (n indicates that each servo area 110 specified by the servo sector number n is the n-th servo area on a corresponding track). The servo sector number is used to specify the data sector numbers of a plurality of data sectors arranged between each servo area 110 and the next servo area 110 on the same track. The cylinder number section 110*d* stores a cylinder number (cylinder code) indicative of the cylinder position of the corresponding track (cylinder) on which each servo area 110 is located. The burst section 110*e* stores burst data. The burst data is a positional error signal indicative of the positional error of each servo area 110 on the cylinder. This signal indicates the error in terms of a waveform amplitude. The cylinder number and burst data are used as position information for positioning each head 12 in a target area on a target track.

Referring again to FIG. 1, each disk 11*i* (i=a, b) is spun at a high speed by a spindle motor (hereinafter referred to as an "SPM") 13. Each head 12 is attached to a corresponding actuator (head actuator) 14, and can radially move on a corresponding disk 11*i* in accordance with the rotation of the actuator 14. As a result, each head 12 is moved to a target track. The actuator 14 includes a voice coil motor (hereinafter referred to as a "VCM") 15 as its driving source, and is driven by the VCM 15. The SPM 13 is powered by a driving current (SPM current) supplied from an SPM driver 16. The VCM 15 is powered by a driving current (VCM current) supplied from a VCM driver 17. In this embodiment, the SPM driver 16 and VCM driver 17 are included in a driver IC 18 integrated in one chip. A CPU 24 determines values (control variables) used to determine respective driving currents supplied from the SPM driver 16 to the SPM 13 and from the VCM driver 17 to the VCM 15. One of the control variables is supplied to the SPM driver 16 via a D/A (Digital/Analog) converter (D/A) 18*a*, and the other to the VCM driver 17 via a D/A converter 18*b*.

Each head 12 is connected to a head IC 19 mounted on a flexible printed circuit board (FPC). The head IC 19 includes a read amplifier and a write amplifier. The read amplifier amplifies a read signal read by a head 12 that is selected by the CPU 24. The write amplifier converts write data into a write current. The head IC 19 is connected to a read/write IC (hereinafter referred to as a "R/W channel") 20.

The R/W channel 20 executes various signal processes. These signal processes include an A/D (Analog/Digital) conversion process executed on a read signal, an encoding process on write data, and a decoding process on read data. The R/W channel 20 has a function for detecting servo information from a read signal in accordance with a servo gate pulse generated by a gate array 21, and a function for transferring (by, for example, serial transfer) the detected servo information to the gate array 21.

The gate array 21 is an ASIC (Application Specific Integrated Circuit). The gate array 21 has a function for detecting a servo mark contained in servo information transferred from the R/W channel 20 and generating a servo gate pulse indicative of the detection timing of the next servo information. The gate array 21 also has a function for generating a servo sector pulse SSP in accordance with the detection of a servo mark. The servo sector pulse SSP is used as an interrupt signal (servo interrupt signal) to be supplied to the CPU 24 for each servo (each servo area 110). Further, the gate array 21 includes a register (not shown) for holding servo information transferred from the R/W channel 20.

A buffer memory 22 is used to temporarily store data (write data) transferred from a host (host system) using the HDD and to be written to each disk 11$i$ (i=a, b), and also to temporarily store data (read data) read from each disk 11$i$ and to be transferred to the host. The buffer memory 22 is, for example, a RAM (Random Access Memory) as a rewritable memory. A disk controller 23 is used to receive commands (a write command, a read command, etc.) transferred from the host, and has an interface control function for controlling data transfer between the host and the disk controller 23. The disk controller 23 also has a disk control function for controlling data transfer between each disk 11$i$ and the disk controller 23 via the R/W channel 20 and the head IC 19, and a buffer control function for controlling the buffer memory 22.

The CPU 24 controls the entire HDD in accordance with a control program stored in, for example, a ROM (Read Only Memory) 25 as a nonvolatile memory. The control executed by the CPU 24 includes read/write control executed, using the disk controller 23, in response to a read/write command from the host, and positioning control for positioning each head 12 on a target track, etc. The positioning control is executed on the basis of position information (cylinder number and burst data) contained in servo information held in the register of the gate array 21, each time the gate array 21 outputs a servo sector pulse SSP. The CPU 24 is connected to a RAM 26 which provides, for example, a work area for the CPU 24. Instead of this configuration, the CPU 24 can be configured to contain the ROM 25 and RAM 26.

Figure 3:
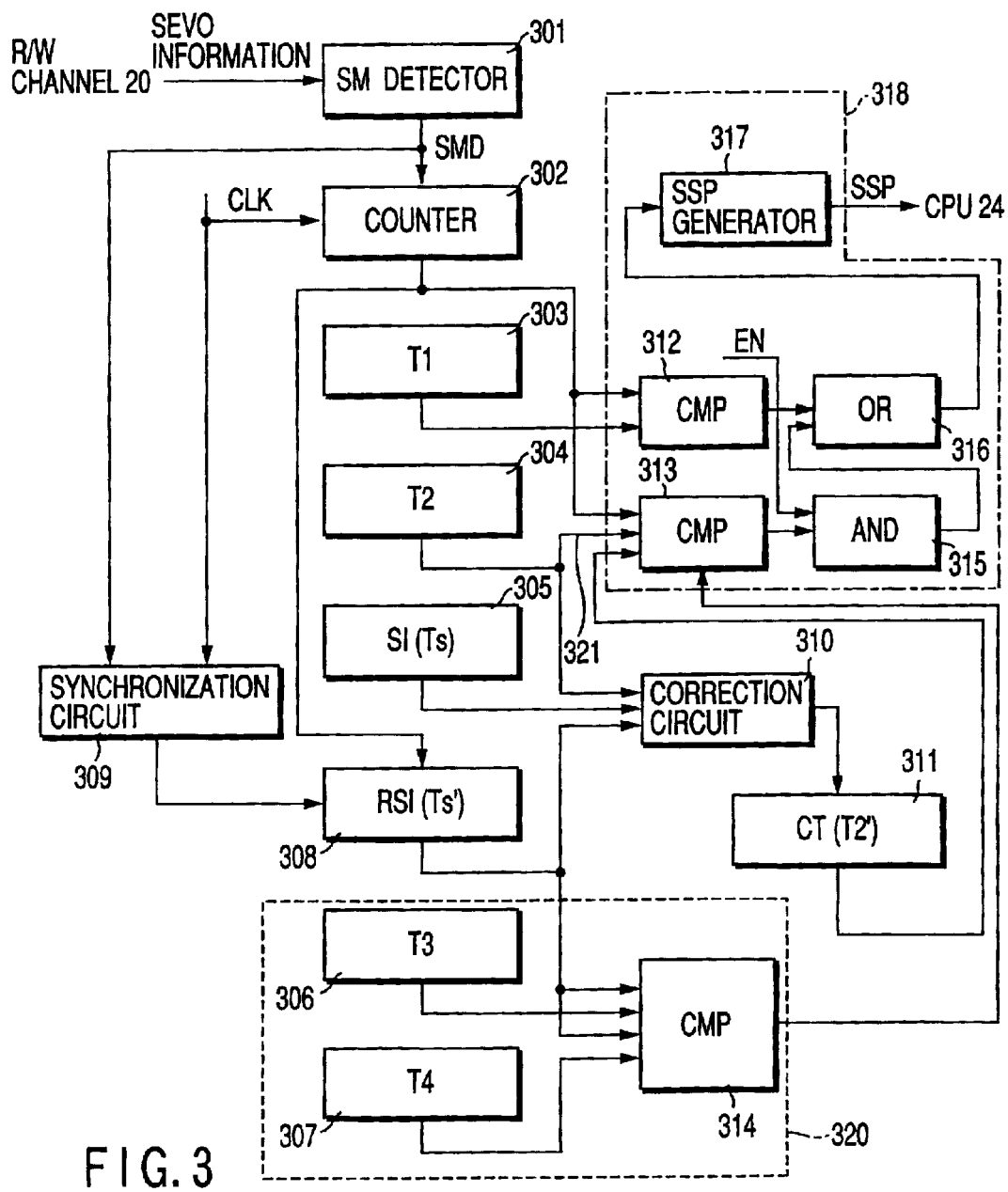
FIG. 3 is a block diagram illustrating a gate array 21 appearing in FIG. 1.

FIG. 3 is a block diagram illustrating the configuration of the gate array (ASIC) 21. The gate array 21 includes a servo mark detector (hereinafter referred to as an "SM detector") 301 and a counter 302. The SM detector 301 detects a servo mark from servo information transferred from the R/W channel 20, and outputs a servo mark detection signal SMD formed of servo mark detection pulses. The counter 302 measures the interval (servo interval) between each pair of adjacent servo mark detection pulses contained in the servo mark detection signal SMD, in synchronism with a clock signal CLK. The gate array 21 also includes a first timing register (hereinafter referred to as a "T1 register") 303, a second timing register (hereinafter referred to as a "T2 register") 304 and a servo interval register (hereinafter referred to as an "SI register") 305. The T1 register 303 holds, as a time period T1, the time period T1 elapsing from the leading edge of a servo mark detection pulse contained in a servo mark detection signal SMD, to the time point at which a servo sector pulse SSP is generated. The T2 register 304 holds, as a time period T2 (T2>>T1), the time period T1 elapsing from the leading edge of a servo mark detection pulse to the time point at which a servo sector pulse SSP is generated. The SI register 305 holds a servo interval (ideal servo interval) Ts (Ts<T2) assumed in an ideal state in which there is no change in the rotational speed of each disk 11$i$ and no runout of each disk 11$i$.

The gate array 21 further includes a lower-limit servo interval register (hereinafter referred to as a "T3 register") 306, an upper-limit servo interval register (hereinafter referred to as a "T4 register") 307, a real servo interval register (hereinafter referred to as an "RSI register") 308 and a synchronization circuit 309. The T3 and T4 registers 306 and 307 hold a lower-limit servo interval T3 and an upper-limit servo interval T4, respectively, which are set in light of the case where there is a change in the rotational speed of each disk 11$i$ or runout of each disk 11$i$. The RSI register 308 holds a servo interval (real servo interval) Ts' measured by the counter 302. The synchronization circuit 309 generates a timing signal indicative of a time point at which the real servo interval Ts' is held in the RSI register 308, on the basis of the servo mark detection signal SMD and the clock signal CLK.

The gate array 21 further includes a correction circuit 310 and a correction timing register (hereinafter referred to as a "CT register") 311. The correction circuit 310 corrects the time period T2 on the basis of the ideal servo interval Ts and the real servo interval Ts', thereby generating a corrected time period T2'. The CT register 311 holds the time period T2' corrected by the correction circuit 310. The gate array 21 yet further includes comparators (CMP) 312, 313 and 314, an AND gate 315, an OR gate 316 and an SSP (servo sector pulse) generator 317. The comparator 312 compares the count value of the counter 302 with the value T1 of the T1 register 303. The comparator 313 compares the count value of the counter 302 with either the value T2 of the T2 register 304 or the value T2' of the CT register 311 in accordance with a signal output from the comparator 314. The comparator 314 compares the value Ts' of the RSI register 308 with the value of T3 of the T3 register 306 and also with the value T4 of the T4 register 307. The AND gate 315 receives the comparison result of the comparator 313 and an enable signal EN output from the CPU 24. The OR gate 316 receives the output of the AND gate 315 and the comparison result of the comparator 312. The SSP generator 317 generates a servo sector pulse SSP in accordance with a signal output from the OR gate 316. The comparators 312 and 313, AND gate 315, OR gate 316 and SSP generator 317 form an SSP generating section 318 for generating a servo sector pulse SSP on the basis of the time period T1, and generating a servo sector pulse SSP on the basis of the time period T2 or the corrected time period T2'.

Referring then to the timing charts of FIGS. 4A to 4C, 5A to 5C and 6A to 6C, a description will be given of the operation of the HDD shown in FIG. 1, which is executed, in particular, when generating sector pulses using the gate array 21. Suppose that one of the heads 12 provided for respective recording surfaces of the disks 11$a$ and 11$b$ is selected by the CPU 24 via the head IC 19. The head 12 selected by the CPU 24 reads information magnetically recorded on a corresponding recording surface of a corresponding disk 11$i$ (i is a or b), and converts it into an electrical signal. This electrical signal, i.e., a signal (read signal) read from the corresponding disk 11$i$ by the head 12, is amplified by the head IC 19 and input to the R/W channel 20. The R/W channel 20 also inputs a servo gate pulse that is contained in a servo gate signal output from the gate array 21 and is output at a time point corresponding to the position of a corresponding servo area 110. The R/W channel 20 executes gain control and phase acquisition based on a signal (AGC signal) contained in the AGC section 110$a$ of the read signal output from the head IC 19. After that, the R/W channel 20 sequentially detects, from the read signal, information of the servo mark section 110$b$, servo sector number section 110$c$, cylinder number section 110$d$ and burst section 110$e$, i.e., a servo mark, a servo sector number, a cylinder number and burst data. The R/W channel 20 transfers, to the gate array 21, servo information including the detected servo mark, servo sector number, cylinder number and burst data.

The servo mark detector 301 in the gate array 21 detects the servo mark contained in the servo information transferred from the R/W channel 20, and outputs a servo mark detection pulse which is high (logic "1") for only a predetermined time period after the detection of the servo mark. In other words, the servo mark detector 301 outputs a servo mark detection pulse each time it detects a servo mark in servo information. A servo mark detection signal SMD formed of a string of servo mark detection pulses output from the servo mark detector 301 is supplied to the counter 302 and synchronization circuit 309. On the other hand, the servo information transferred from the R/W channel 20 to the gate array 21 is held in a register (not shown) incorporated in the gate array 21, until the next servo information is transferred thereto.

The counter 302 of the gate array 21 executes a counting operation in synchronism with each clock (clock pulse) of the clock signal CLK. The counter 302 stops its counting operation when the level of the servo mark detection signal SMD from the servo mark detector 301 becomes high, i.e., when the servo mark detector 301 outputs a servo mark detection pulse. At this time, the count value of the counter 302 is latched by the RSI register 308 at a time point set by the synchronization circuit 309. The time point set by the synchronization circuit 309 corresponds to the output timing of that clock of the clock signal CLK, which is output immediately after the output of a servo detection pulse from the servo mark detector 301. The counter 302 is reset in synchronism with the output of the next clock, thereby resuming its counting operation. In other words, the counter 302 measures the time each time the servo mark detector 301 outputs a servo mark detection pulse. The real servo interval register 212 holds the time measured between two continuous servo mark detection pulses, i.e., the actually measured servo interval Ts'.

The comparator 312 compares the count value of the counter 302 with the value T1 of the T1 register 303. If they are identical to each other, the comparator 312 outputs a signal of a high level (logic "1") indicative of the fact. The output signal of the comparator 312 is input to the OR gate 316. Accordingly, the output of the OR gate 316 is high when the count value of the counter 302 is identical to the time period T1. The SSP generator 317 outputs a servo sector pulse SSP when the level of the output of the OR gate 316 has become high. The servo sector pulse SSP is supplied to the CPU 24 and serves as a servo interrupt signal.

Thus, in the embodiment, each time the servo mark detector 301 detects a servo mark, and the servo mark detection signal SMD is high for a predetermined time period as shown in FIG. 4B, 5B or 6B, i.e., each time a servo mark pulse 41, 51 or 61 is output, a servo sector pulse SSP is output when the time period T1 has elapsed after the output of the servo mark pulse, as shown in FIG. 4C, 5C or 6C.

When the servo mark detector 301 has output a servo mark detection pulse, the RSI register 308 latches the interval between the servo mark detection pulse and the preceding servo mark detection pulse, i.e., the (measured) real servo interval Ts'. The comparator 314 compares the value Ts' of the RSI register 308 with the value T3 of the T3 register and also with the value T4 of the T4 register 307. If Ts'<T3 or Ts'>T4, the comparator 314 outputs a signal of a high level (logic "1") indicating that the time period T2 should be corrected, i.e., that the time period T2 ' obtained by correcting the time period T2 should be used. Suppose here that Ts≦T4≦T2. Further, if neither Ts'<T3 nor Ts'>T4, i.e., if T3≦Ts'≦T4, the comparator 314 outputs a signal of a low level (logic "0") indicating that it is not necessary to correct the time period T2, i.e., that the time period T2 should be used.

Supposing here that T3=0 and T4=Ts (the ideal servo interval), the comparator 314 outputs the signal of the high level (logic "1"), if Ts'>Ts, i.e., if the measured servo interval Ts' is longer than the ideal servo interval Ts. Further, supposing that T3=Ts−ΔT and T4=Ts+ΔT, the comparator 314 outputs the signal of the high level (logic "1"), if Ts'<(Ts−ΔT) or Ts'>(Ts+ΔT). ΔT indicates a maximum allowable change in the servo interval.

The correction circuit 310 corrects the value T2 of the T2 register 304 on the basis of the value Ts' of the RSI register 308 and the value Ts of the SI register 305, each time the RSI register 308 latches the real servo interval Ts', thereby obtaining the corrected time period T2'. The correction circuit 310 executes this calculation using the following equation (1):

$$T2'=T2*Ts'/Ts \qquad (1)$$

The equation (1) may be replaced with the following equation:

$$T2'=T2+(Ts'-Ts)$$

Thus, the correction circuit 310 corrects the time period T2 on the basis of the degree of displacement of the real servo interval Ts' from the ideal servo interval Ts (the ratio Ts'/Ts or the difference Ts'−Ts), thereby generating the corrected time period T2'. The CT register 311 holds the corrected time period T2'.

The comparator 313 compares the count value of the counter 302 with the value T2 of the T2 register 304 if the output signal of the comparator 314 is low, i.e., if it is not necessary to correct the time period T2. If, on the other hand, the output signal of the comparator 314 is high, i.e., if it is necessary to correct the time period T2, the comparator 313 compares the count value of the counter 302 with the value T2' of the CT register 311. If the comparison result indicates that the values are identical to each other, the comparator 313 outputs a signal of a high level (logic "1") indicative of the fact. As is evident from the above, if the servo mark detector 301 detects the next servo mark before the count value of the counter 302 reaches T2 or T2', the counter 302 is reset and restarted, and hence there is no possibility of the comparator 311 outputting a signal indicating that the compared values are identical to each other. In other words, the comparator 311 outputs the signal indicating that the compared values are identical to each other, only when the servo mark detector 301 does not detect the next servo mark, even if the count value of the counter 302 reaches T2 or T2'.

The output signal of the comparator 313 is supplied to the AND gate 315, together with the enable signal EN. The enable signal EN is set at high (logic "1") in the cases other than immediately after head selection, described later. In this case, the AND gate 315 directly supplies the output signal of the comparator 313 to the OR gate 316. As a result, the output of the OR gate 316 is high when the comparator 313 has detected that the compared values are identical to each other, and in the normal state in which the enable signal EN is high. When the output level of the OR gate 316 has become high, the SSP generator 317 generates a servo sector pulse SSP.

As described above, in the embodiment, if Ts' (real servo interval)<T3 or Ts'>T4, when the count value of the counter 302 has come to be identical to the corrected time period T2', it is determined that no servo mark has been detected, thereby generating a pseudo servo sector pulse SSP. On the other hand, if T3<Ts'<T4, when the count value of the counter 302 has come to be identical to the time period T2, it is determined that no servo mark has been detected, thereby generating a pseudo servo sector pulse SSP.

A description will now be given of the advantage of switching the time period from T2 to T2' after which a pseudo servo sector pulse is output, if Ts' (real servo interval)<T3 or Ts'>T4. In an HDD in which servo information items are recorded on each disk 11i at regular intervals in the direction of the circumference of each disk, if there is no change in the rotational speed of each disk or no runout of each disk, servo marks contained in the respective servo information items are detected at regular intervals of Ts' equal to the ideal servo interval Ts. In other words, the real servo interval Ts' is identical to the ideal one Ts, as shown in FIG. 4B. In this state, suppose that even if the counter 302 measures a time period, identical to the time period T2, after the detection of a servo detection pulse 42 in FIG. 4B, no next servo mark is detected and therefore no next servo mark detection pulse 43 is output. In this case, as shown in FIGS. 4B and 4C, a servo sector pulse SSP is output at a time point the time period T2 after the output of the leading edge of the servo mark detection pulse 42. T2 is set at a higher value than Ts. Accordingly, in the embodiment, there is no danger of the next servo mark detection pulse 43 being output after the generation of a servo sector pulse SSP at a time point the time period T2 after the output of the leading edge of the servo mark detection pulse 42. This means that there is no danger of two servo sector pulses SSP being output for one servo (servo information item).

In an actual HDD, however, the servo intervals vary due to changes in the rotational speed of each disk 11i or runout of each disk 11i. Accordingly, the real servo interval Ts' may be displaced from the ideal servo interval Ts. Suppose here that the servo interval Ts' has become longer than the time period T2 (T2>Ts), as shown in FIG. 5B or 6B (Ts'>T4). In this state, suppose that the next servo mark is not detected and hence the next servo mark detection pulse 53 is not output, even after the counter 302 measures a time period, identical to the corrected time period T2', after the output of the leading edge of a servo mark detection pulse 52, as is shown in FIG. 5B. At this time, in this embodiment, a servo mark sector pulse SSP is output at a time point the time period T2' after the output of the leading edge of the servo mark detection pulse 52, as is shown in FIGS. 5B and 5C.

On the other hand, when the next servo mark 63 has been output before the corrected time period T2' elapses after the output of the leading edge of a servo mark detection pulse 62, a servo sector pulse SSP based on the time period T2' is not generated, as is shown in FIGS. 6B and 6C. However, if, as in the prior art, a servo sector pulse SSP is generated on the basis of the time period T2 that is not corrected, the pulse SSP is generated at a time point the time period T2 after the servo mark detection pulse 62, before the output of the servo mark detection pulse 63. In this case, another servo sector pulse SSP is also generated at a time point the time period T1 after the output of the servo mark detection pulse 63. In other words, two servo sector pulses SSP are generated for one servo. However, as described above, the embodiment employs, the corrected time period T2', i.e., T2*Ts'/Ts or T2+(Ts'−Ts), in place of the time period T2, which prevents the generation of two servo sector pulses SSP for one servo. In other words, in the embodiment, the influence of changes in the rotational speed of a disk or runout of the disk can be minimized by generating a servo sector pulse SSP using the corrected time period T2'. As a result, a servo sector pulse SSP, corresponding to a position at which a servo mark is estimated to exist, can be generated substantially at regular intervals, even if the servo mark is not detected. In addition, even if the servo interval is longer than the time period T2 because of a change in the rotational speed of a disk or runout of the disk, the generation of two servo sector pulses SSP for one servo can be avoided.

[First Modification]

A modification of the embodiment will now be described. In the above-described embodiment, to generate the servo sector pulse SSP, the time period T2 or the corrected time period T2' is used depending upon the comparison result of the comparator 314 based on the real servo interval Ts'. On the other hand, in the first modification, the corrected time period T2' is always used. In this modification, if Ts'=Ts, T2'=T2. This modification does not require the T3 register 306, T4 register 307 and comparator 314, which are encircled by the broken line 320 in FIG. 3. Further, it is sufficient if the comparator 313 always compares the count value of the counter 302 with the value T2' of the CT register 311, irrespective of the value of the real servo interval Ts'. Accordingly, a transmission line for transmitting T2 from the T2 register 304 to the comparator 313, denoted by reference numeral 321 in FIG. 3, is not necessary, either.

[Second Modification]

Referring then to the timing charts of FIGS. 7A to 7C and 8A to 8C, a second modification of the embodiment will be described. In the above embodiment, if the servo mark detector 301 does not detect a servo mark and hence does not output a servo mark detection pulse, a servo sector pulse SSP is generated on the basis of the time period T2' or T2. On the other hand, in the second modification, if the real servo interval Ts' latched by the SI register 305 falls outside a preset allowable servo interval range, the generation of a servo sector pulse SSP based on the corrected time period T2' elapsing from the measurement of Ts' is inhibited. The lower and upper limits of the servo interval range are T3 and T4, respectively. In the figures, Ts'b represents a real servo interval Ts' that falls outside the servo interval range. Accordingly, Ts'b<T3 or Ts'b>T4. Further, T2'b represents a corrected time period T2' assumed upon the measurement of Ts'b. In this case, as shown in FIGS. 7B and 7C, the generation of a servo sector pulse SSP is inhibited at a time point the corrected time period T2'b after the measurement of the real servo interval Ts'b. Thus, in the second modification, if the real servo interval falls outside the allowable servo interval range, the generation of a servo sector pulse based on T2 or T2' is inhibited. As a result, the generation of a servo sector pulse SSP at an abnormal time point due to erroneous detection of a real servo interval based on erroneous detection of a servo mark can be inhibited.

Thus, in the case shown in FIGS. 7A to 7C, the generation of a servo sector pulse SSP the time period T2'b after the real servo interval Ts'b, which falls outside the allowable servo interval range, is measured is inhibited. However, as shown in FIGS. 8A to 8C, it may be determined whether or not the generation of a servo sector pulse SSP is inhibited, on the basis of a real servo interval Ts'a measured before, e.g. immediately before, Ts'b. In this case, only if the previously measured Ts'a falls outside the servo interval range like Ts'b, the generation of a servo sector pulse SSP the time period T2 or T2'b after the measurement of Ts'b is inhibited.

On the other hand, if the previously measured Ts'a falls within the servo interval range, a servo sector pulse SSP is generated a time period T2'a after the measurement of Ts'b, as shown in FIGS. 8B and 8C. The time period T2'a corresponds to T2' in the above embodiment, and is obtained by correcting T2' using Ts'a. That is, in the second modification, even if the real servo interval falls outside the allowable servo interval range, if the real servo interval measured immediately before the first-mentioned real servo interval falls within the allowable servo interval range, a servo sector pulse may be generated using the time period T2' corrected on the basis of the servo interval falling within the servo interval range. This prevents a servo sector pulse SSP from being generated at an abnormal timing due to erroneous detection of a real servo interval caused by erroneous detection of a servo mark. As a result, servo sector pulse SSP is generated at a correct timing. In the second modification, if the real servo interval Ts'b falls within the allowable servo interval range, either the time period T2 or T2'b (corresponding to T2' in the above-described embodiment) may be used to generate a servo sector pulse SSP when the servo interval Ts'b has been measured.

[Third Modification]

Referring now to the timing charts of FIGS. 9A to 9D, a third modification of the embodiment will be described. In the above embodiment, no consideration is given to the fact that head selection (switching) causes a significant change between the position of servo information detected by the previously selected head 12 and that of servo information detected by a newly selected one. More specifically, in the above embodiment, no consideration is given to a case where a change in the servo interval falls outside a predetermined narrow range and hence the servo interval extremely changes, when a head 12 corresponding to a recording surface Hi of the disk 11a or 11b has been switched to another one corresponding to another recording surface Hj. Accordingly, the following problem will occur when the measured servo interval Ts' between a servo mark detection pulse 91 generated during servo mark detection executed immediately before head selection, and a servo mark detection pulse 92 generated during servo mark detection executed immediately after the head selection is shorter than the real servo interval on a single recording surface as shown in FIGS. 9A to 9C. When using, as in the above embodiment, the time period T2' corrected on the basis of the servo interval Ts' between the servo mark detection pulses 91 and 92, the generation of a servo sector pulse 94 indicated by the broken line in FIG. 9D may be earlier than that of the next servo mark detection pulse 93 shown in FIG. 9C. In this case, when the servo sector pulse 94 has been generated the time period T2' after the generation of the leading edge of the servo mark detection pulse 92, a servo mark is detected and the servo mark detection pulse 93 is output. As a result, a servo sector pulse 95 is generated a time period T1 after the generation of the leading edge of the servo mark detection pulse 93, as shown in FIG. 9D. In other words, tow servo sector pulses SSP are generated for one servo.

To avoid it, in the third modification, immediately after head selection, the generation of a servo sector pulse by an SSP generator 317 on the basis of the time period T2 or T2' is inhibited until at least two correct servo marks are detected from servo information stored in servo areas 110. To this end, the CPU 24 sets the enable signal EN at low (logic "0") after head selection. After the head selection, the CPU 24 starts the counting of servo sector pulses SSP output thereto from (the SSP generator 317 in) the gate array 21. When the CPU 24 has counted two servo sector pulses SSP, it reads the output of the comparator 314 of the gate array 21. In the case of FIGS. 9A to 9D, the CPU 24 reads the output of the comparator 314 upon receiving the servo sector pulse 95 from the gate array 21.

If the output level of the comparator 314 is low (logic "0"), the CPU 24 determines that the interval between the servo mark detection pulse 93 corresponding to the servo sector pulse 95 and the preceding servo mark detection pulse 92, i.e., the real servo interval, falls within a predetermined range. In this case, the CPU 24 determines that at least two servo marks have been detected at a correct interval. At this time, the CPU 24 switches the enable signal EN to high (logic "1"), thereby permitting the SSP generator 317 to generate a servo sector pulse SSP on the basis of the time period T2 or T2'. The enable signal EN is controlled by the CPU 24 accessing an enable signal set or reset register (not shown) incorporated in the gate array 21.

If, on the other hand, the output level of the comparator 314 is high (logic "1"), the CPU 24 repeats the operation of reading the output of the comparator 314 in accordance with a servo sector pulse SSP, until the output level of the comparator 314 becomes low (logic "0"). Thus, in the third modification, the SSP generator 317 is inhibited from generating a servo sector pulse SSP on the basis of the time period T2 or T2', until servo marks are normally detected from at least two sequential servo information items after head selection. As a result, even if a change in the servo interval falls outside a predetermined narrow range, and hence the servo interval changes extremely, a servo sector pulse can be generated at an expected, correct timing, thereby preventing two servo sector pulses SSP from being generated for one servo. In general, upon head selection between the different disks 11a and 11b, it is very possible that an extreme change in the servo interval will occur. In light of this, the generation of a servo sector pulse based on the time period T2 or T2' may be inhibited only immediately after head selection between the different disks 11a and 11b.

In the above-described embodiment, the present invention is applied to an HDD (Hard Disk Drive). However, the present invention is also applicable to a disk storage apparatus other than HDDs, such as a magneto-optical disk drive. It is sufficient if the disk storage apparatus is provided with disk storage mediums on which servo information is recorded at regular intervals in the direction of the circumference of the mediums.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive apparatus comprising:
   at least one disk including at least one recording surface on which servo information items are recorded at regular intervals in a direction of a circumference of the at least one disk, the servo information items including respective position information items and respective servo marks used to identify the servo information items;
   a head provided for the at least one recording surface and used to read information from the at least one disk;
   a servo detector configured to detect each servo information item from the information read by the head from the at least one disk;
   a servo mark detector configured to detect a corresponding one of the servo marks from said each servo information item detected by the servo detector;
   a counter configured to measure a servo interval, the servo interval being an interval between two successive ones of the servo marks detected by the servo mark detector;

a correction circuit configured to correct a predetermined time period T2 on the basis of the servo interval measured by the counter and a predetermined ideal servo interval;

a determination circuit configured to determine which one of the time period T2 and a time period T2' obtained by correcting the time period T2 using the correction circuit should be used; and a servo-sector-pulse-generating unit configured to generate a servo sector pulse a predetermined time period T1 after the servo mark detector detects each servo mark, the time period Ti being shorter than the time period T2, the servo-sector-pulse-generating unit generating a pseudo servo sector pulse when the time period determined by the determination circuit has elapsed after detection of said each servo mark, if a next servo mark is not detected during the time period determined by the determination circuit.

2. The disk drive apparatus according to claim 1, wherein the correction circuit corrects the time period T2 on the basis of a degree of displacement of the measured servo interval from the ideal servo interval.

3. The disk drive apparatus according to claim 2, wherein the degree of displacement is expressed by a ratio of the measured servo interval to the ideal servo interval.

4. The disk drive apparatus according to claim 3, wherein the correction circuit calculates the time period T2' from the following equation:

$$T2'=T2*Ts'/Ts$$

where Ts represents the ideal servo interval, Ts' represents the measured servo interval, and Ts'/Ts represents the ratio.

5. The disk drive apparatus according to claim 2, wherein the degree of displacement is expressed by a difference between the measured servo interval and the ideal servo interval.

6. The disk drive apparatus according to claim 5, wherein the correction circuit calculates the time period T2' from the following equation:

$$T2'T2+(Ts'-Ts)T2'$$

where Ts represents the ideal servo interval, Ts' represents the measured servo interval, and (Ts'-Ts) represents the difference.

7. The disk drive apparatus according to claim 1, wherein the determination circuit is a comparator configured to compare the servo interval measured by the counter with the ideal servo interval, the determination circuit determining that the servo-sector-pulse-generating unit should use the time period T2', if the measured servo interval is longer than the ideal servo interval.

8. The disk drive apparatus according to claim 1, wherein the determination circuit is a comparator configured to compare the servo interval measured by the counter with predetermined lower and upper servo intervals, the determination circuit determining that the servo-sector-pulse-generating unit should use the time period T2', if the measured servo interval falls outside an allowable range defined between the predetermined lower and upper servo intervals.

9. The disk drive apparatus according to claim 8, wherein the comparator uses 0 and the ideal servo interval as the lower and upper servo intervals, respectively.

10. The disk drive apparatus according to claim 8, wherein the comparator uses, as the lower servo interval, a value obtained by subtracting, from the ideal servo interval, a predetermined allowable value by which the measured servo interval can vary, the comparator also using, as the upper servo interval, a value obtained by adding the allowable value to the ideal servo interval.

11. The disk drive apparatus according to claim 8, further comprising means for detecting a particular state, in which servo marks are detected normally by the servo mark detector from at least two successive servo information items, immediately after head selection in which a head, which corresponds to one of the recording surfaces of a plurality of disks including the at least one disk, is switched to a head which corresponds to another recording surface of the disks, and wherein the servo-sector-pulse-generating unit is inhibited from generating the servo sector pulse on the basis of the time period T2, immediately after the head selection until the particular-state-detecting means detects the particular state.

12. The disk drive apparatus according to claim 11, wherein the particular-state-detecting means determines that the particular state has been detected, when the servo-sector-pulse-generating unit has generated at least two servo sector pulses immediately after the head selection, and when the comparator has detected that the measured servo interval falls within the allowable range.

13. The disk drive apparatus according to claim 11, wherein the particular-state-detecting means sets, immediately after the head selection, the servo-sector-pulse-generating unit in an inhibition state in which generation of the servo sector pulse based on the time period T2 is inhibited, and releases the servo-sector-pulse-generating unit from the inhibition state upon detection of the particular state.

14. The disk drive apparatus according to claim 11, wherein the particular-state-detecting means is a CPU to control the head selection.

15. A disk drive apparatus comprising:

at least one disk including at least one recording surface on which servo information items are recorded at regular intervals in a direction of a circumference of the at least one disk, the servo information items including respective position information items and respective servo marks used to identify the servo information items;

a head provided for the at least one recording surface and used to read information from the at least one disk;

a servo detector configured to detect each servo information item from the information read by the head from the at least one disk;

a servo mark detector configured to detect a corresponding one of the servo marks from said each servo information item detected by the servo detector;

a counter configured to measure a servo interval, the servo interval being an interval between two successive ones of the servo marks detected by the servo mark detector;

a correction circuit configured to correct a predetermined time period T2 on the basis of the servo interval measured by the counter and a predetermined ideal servo interval; and a servo-sector-pulse-generating unit configured to generate a servo sector pulse a predetermined time period T1 after the servo mark detector detects each servo mark, the time period T1 being shorter than the time period T2, the servo-sector-pulse-generating unit generating a pseudo servo sector pulse when a time period T2', obtained by correcting the time period T2 using the correction circuit, has elapsed after detection of said each servo mark, if a next servo mark is not detected during the time period T2'.

16. The disk drive apparatus according to claim 15, wherein the correction circuit corrects the time period T2 on the basis of a degree of displacement of the measured servo interval from the ideal servo interval.

17. The disk drive apparatus according to claim 15, further comprising a comparator configured to compare the servo interval measured by the counter with predetermined lower and upper servo intervals, thereby determining whether the measured servo interval falls within an allowable range defined between the predetermined lower and upper servo intervals, and wherein the servo-sector-pulse-generating unit is inhibited from generating the servo sector pulse on the basis of the time period T2', if the comparator detects that the measured servo interval falls outside the allowable range.

18. The disk drive apparatus according to claim 15, further comprising a comparator configured to compare the servo interval measured by the counter with predetermined lower and upper servo intervals, thereby determining whether the measured servo interval falls within an allowable range defined between the predetermined lower and upper servo intervals, and wherein if the comparator detects that the measured servo interval falls outside the allowable range, the servo-sector-pulse-generating unit generates the servo sector pulse on the basis of the time period T2', the time period T2' being obtained by correcting the time period T2 using the correction circuit on the basis of a servo interval falling within the allowable range and measured before the measured servo interval detected to fall outside the allowable range.

19. The disk drive apparatus according to claim 15, further comprising a comparator configured to compare the servo interval measured by the counter with predetermined lower and upper servo intervals, thereby determining whether the measured servo interval falls within an allowable range defined between the predetermined lower and upper servo intervals, and wherein if the comparator detects that the measured servo interval falls outside the allowable range, the servo-sector-pulse-generating unit generates the servo sector pulse on the basis of the time period T2', the time period T2' being obtained by correcting the time period T2 using the correction circuit on the basis of a servo interval falling within the allowable range and measured immediately before the servo interval detected to fall outside the allowable range.

20. The disk drive apparatus according to claim 19, wherein the servo-sector-pulse-generating unit is inhibited from generating the servo sector pulse on the basis of the time period T2', if the servo interval measured immediately before the servo interval detected to fall outside the allowable range also falls outside the allowable range.

21. A method of detecting each of servo information items, which include respective position information items and respective servo marks used to identify the servo information items, from information read by a head from a disk on which the servo information items are recorded at regular intervals in a direction of a circumference of the disk, thereby detecting a corresponding one of the servo marks from said each servo information item, and generating a servo sector pulse, the method comprising:

measuring a servo interval whenever each servo mark has been detected, the servo interval being an interval between two successive ones of the servo marks;

generating a servo sector pulse a time period T1 after detection of said each servo mark;

correcting a predetermined time period T2, which is longer than the time period T1, on the basis of the measured servo interval and a predetermined ideal servo interval;

determining which one of the time period T2 and a time period T2' obtained by correcting the time period T2 should be used; and generating a pseudo servo sector pulse when the time period determined in the determining has elapsed after detection of said each servo mark, if a next servo mark is not detected during the determined time period.

22. The method according to claim 21, wherein in the correcting, the time period T2 is corrected on the basis of a degree of displacement of the measured servo interval from the ideal servo interval.

23. The method according to claim 21, further comprising detecting whether the measured servo interval falls outside a predetermined allowable servo interval range, and wherein in the determining, the time period T2' obtained by correction in the correcting is used to generate the pseudo servo sector pulse, if it is detected that the measured servo interval falls outside the allowable servo interval range.

24. A method of detecting each of servo information items, which include respective position information items and respective servo marks used to identify the servo information items, from information read by a head from a disk on which the servo information items are recorded at regular intervals in a direction of a circumference of the disk, thereby detecting a corresponding one of the servo marks from said each servo information item, and generating a servo sector pulse, the method comprising:

measuring a servo interval whenever each servo mark has been detected, the servo interval being an interval between two successive ones of the servo marks;

generating a servo sector pulse a time period T1 after detection of said each servo mark;

correcting a predetermined time period T2, which is longer than the time period T1, on the basis of the measured servo interval and a predetermined ideal servo interval; and generating a pseudo servo sector pulse when a time period T2' obtained by correcting the time period T2 in the correcting has elapsed after detection of said each servo mark, if a next servo mark is not detected during the time period T2'.

* * * * *